(12) United States Patent
Akae

(10) Patent No.: US 8,910,984 B2
(45) Date of Patent: Dec. 16, 2014

(54) ROBOT HAND AND ROBOT

(71) Applicant: Kabushiki Kaisha Yaskawa Denki, Kitakyushu-shi (JP)

(72) Inventor: Hiromitsu Akae, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 14/149,817

(22) Filed: Jan. 8, 2014

(65) Prior Publication Data

US 2014/0117686 A1    May 1, 2014

Related U.S. Application Data

(63) Continuation of application No. PCT/JP2011/065846, filed on Jul. 12, 2011.

(51) Int. Cl.
*B25J 15/08* (2006.01)
*B25J 15/00* (2006.01)

(52) U.S. Cl.
CPC .......... *B25J 15/0028* (2013.01); *B25J 15/0009* (2013.01); *Y10S 901/32* (2013.01); *Y10S 901/38* (2013.01)
USPC ................ 294/111; 294/106; 901/32; 901/38

(58) Field of Classification Search
CPC .... B25J 9/104; B25J 15/0009; B25J 15/0028; B25J 15/022; B25J 15/0233; B25J 15/08; Y10S 901/32; Y10S 901/36; Y10S 901/38; Y10S 901/39
USPC ........ 294/106, 111, 200, 213; 901/32, 36, 38, 901/39; 623/64
See application file for complete search history.

(56) References Cited

U.S. PATENT DOCUMENTS

| | | | |
|---|---|---|---|
| 3,866,966 A * | 2/1975 | Skinner, II | 294/106 |
| 4,643,473 A * | 2/1987 | Douglas | 294/111 |
| 4,865,376 A * | 9/1989 | Leaver et al. | 294/111 |
| 4,986,723 A | 1/1991 | Maeda | |
| 5,200,679 A * | 4/1993 | Graham | 318/568.16 |

(Continued)

FOREIGN PATENT DOCUMENTS

| | | |
|---|---|---|
| JP | 10-217167 | 8/1998 |
| JP | 2001-277174 | 10/2001 |

(Continued)

OTHER PUBLICATIONS

International Search Report for corresponding International Application No. PCT/JP2011/065846, Aug. 30, 2011.

(Continued)

*Primary Examiner* — Dean Kramer
(74) *Attorney, Agent, or Firm* — Mori & Ward, LLP

(57) ABSTRACT

An object is to provide a robot hand and a robot that are compact and lightweight and can reliably hold various types of workpieces. To achieve this object, the robot hand and the robot include: a plurality of joint portions that rotates about respective rotation axes parallel with each other; a plurality of links that is connected via each of the joint portions in sequence from a distal end; a linking member that links rotations of the joint portions adjacent to each other; and a single drive source that drives only the joint portion at a proximal end to rotate the joint portion.

13 Claims, 6 Drawing Sheets

(56) References Cited

U.S. PATENT DOCUMENTS

| | | | | |
|---|---|---|---|---|
| 5,570,920 | A | * | 11/1996 | Crisman et al. ............... 294/111 |
| 7,407,208 | B2 | * | 8/2008 | Tadano ......................... 294/111 |
| 2009/0025502 | A1 | * | 1/2009 | Nakamoto ................. 74/490.01 |
| 2010/0061835 | A1 | | 3/2010 | Sim |

FOREIGN PATENT DOCUMENTS

| | | |
|---|---|---|
| JP | 02-145282 | 6/2004 |
| JP | 2008-049456 | 3/2008 |
| JP | 2009-291843 | 12/2009 |
| JP | 2010-064185 | 3/2010 |
| JP | 2010-064242 | 3/2010 |

OTHER PUBLICATIONS

Written Opinion for corresponding International Application No. PCT/JP2011/065846, Aug. 30, 2011.

Japanese Office Action for corresponding JP Application No. 2013-623734, Aug. 26, 2014.

* cited by examiner

ROBOT HAND AND ROBOT

CROSS-REFERENCE TO RELATED APPLICATIONS

This application is a continuation of PCT international application Ser. No. PCT/JP2011/065846 filed on Jul. 12, 2011, the entire contents of which are incorporated herein by reference.

FIELD

The embodiments discussed herein are a robot hand and a robot.

BACKGROUND

A known robot hand is disposed at a terminal moving part of an articulated arm of a robot and holds a workpiece as an object to be held. Such a robot hand includes, for example, a plurality of finger mechanisms that simulate human fingers and, using such finger mechanisms, clamps the workpiece to thereby perform a holding operation.

The workpieces vary more and more in shape and size in recent years. Against this background, techniques have been developed with the aim of responding to the diversity of the workpieces by articulating the finger mechanisms to thereby enhance their degrees of freedom.

In articulating the finger mechanisms, each of the joints may be driven by an individual drive source. This, however, increases the weight of the robot hand and is undesirable because of limited weights of workpieces that can be held.

Japanese Patent Application Laid-open No. 2010-064185 and Japanese Patent Application Laid-open No. 2008-049456 disclose robot hands that include power drive transmitting mechanisms of what is called an underactuated system in which each multiple joint is operated through operative association with each other by a power drive of a single drive source. It is noted that the robot hand incorporates a train of gears (hereinafter referred to as a "gear train") disposed so as to mutually mesh with each other along finger main units or fingers that correspond to the abovementioned finger mechanism and uses the gear train to transmit the power drive of the single drive source to thereby operate each joint.

This allows the robot hand to reduce the number of drive sources to be mounted thereon and thereby achieve reduction in weight.

Use of the related art, however, involves a fairly large space required for the gear train as the power drive transmitting mechanism, which disadvantageously makes the robot hand large in size.

SUMMARY

A robot hand according to an aspect of embodiments includes a plurality of joint portions, a plurality of links, a linking member, and a single drive source. The plurality of joint portions rotates about respective rotation axes parallel with each other. The plurality of links is connected via the joint portions. The linking member links rotations of the joint portions adjacent to each other. The single drive source drives the joint portion at a proximal end to rotate the joint portion.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Robot hands and robots according to embodiments of the present disclosure will be described in detail below with reference to the accompanying drawings. It is noted that examples in each of the embodiments described below are not intended to limit the present invention.

In the following, if the robot hand is likened to a human hand, the member that corresponds to a finger will be described as a "finger mechanism". The member that is included in the "finger mechanism" and that corresponds to a finger joint as a link in the finger will be described as a "finger joint portion". It should be noted that, in the following, what corresponds to the thumb is not included in the "finger mechanism" and will specifically be described as a "thumb portion".

In addition, in the following, an embodiment in which a circular pulley is mounted on a rotary joint of the finger mechanism will be described under a first embodiment and an embodiment in which the pulley is non-circular will be described under a second embodiment.

First Embodiment

Figure 1A:
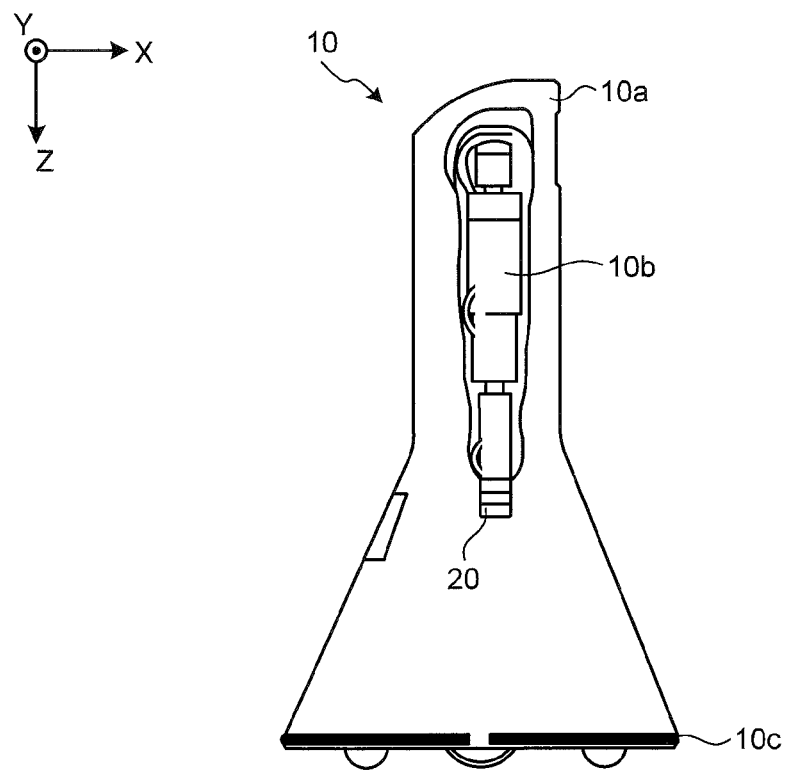
FIG. 1A is a side elevational view of a robot including a robot hand according to a first embodiment.
Figure 1B:
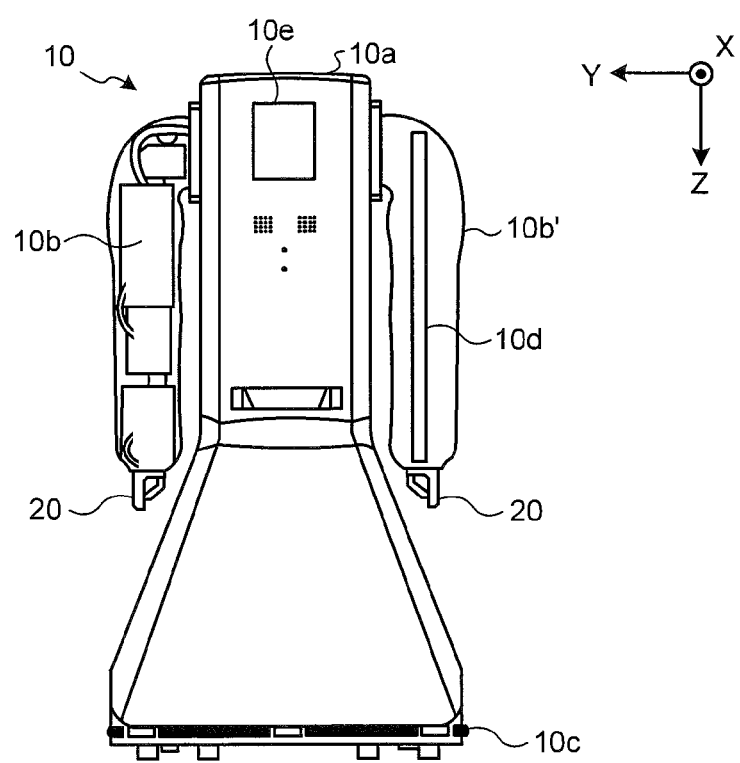
FIG. 1B is a front elevational view of the robot including the robot hand according to the first embodiment.

The robot including the robot hand according to the first embodiment will be outlined with reference to FIGS. 1A and 1B. FIG. 1A is a side elevational view of a robot 10 including a robot hand 20 according to the first embodiment. FIG. 1B is a front elevational view of the robot 10 including the robot hand 20 according to the first embodiment.

For ease of understanding, FIGS. 1A and 1B illustrate a three-dimensional Cartesian coordinate system having a positive Z-axis extending in the vertical direction. Such a Cartesian coordinate system may also be given in other drawings to be referred to in the following descriptions.

In addition, for any element formed in pairs, only a first one of the two may be denoted by a corresponding reference numeral with a second one of the two not denoted. In such cases, each element formed in pairs is configured similarly.

As illustrated in FIG. 1A, the robot 10 according to the first embodiment includes a main unit portion 10a, an arm portion 10b, and a leg portion 10c. The main unit portion 10a constitutes a main body portion of the robot 10, assuming a mechanism that corresponds to a human body.

The arm portion 10b is what is called an articulated arm mounted on a side surface of the main unit portion 10a. The arm portion 10b has the robot hand 20 as an end effector at a terminal moving part. The leg portion 10c is disposed at a lower portion of the main unit portion 10a. The leg portion 10c is a mechanism that causes the robot 10 to advance in an X-axis direction or to swing about an axis extending substantially in parallel with the Z-axis.

As illustrated in FIG. 1B, the robot 10 includes the arm portion 10b in pairs when viewed from the X-axis positive direction. Specifically, the robot 10 is what is called a double-arm robot. It is noted that, as illustrated in FIG. 1B, the arm portion 10b may be covered in an arm cover 10b' formed of fiber reinforced plastics (FRP), so that a mechanical portion of the arm portion 10b can be protected.

As illustrated in FIG. 1B, a pressure sensor 10d, a temperature sensor (not illustrated), and the like may be mounted on the arm cover 10b'. Control can then be performed in which, for example, contact with an obstacle is detected and the obstacle is circumvented during movement.

As illustrated in FIG. 1B, the robot 10 may include various devices relating to a user interface, such as a display monitor 10e that outputs display information.

Figure 2:
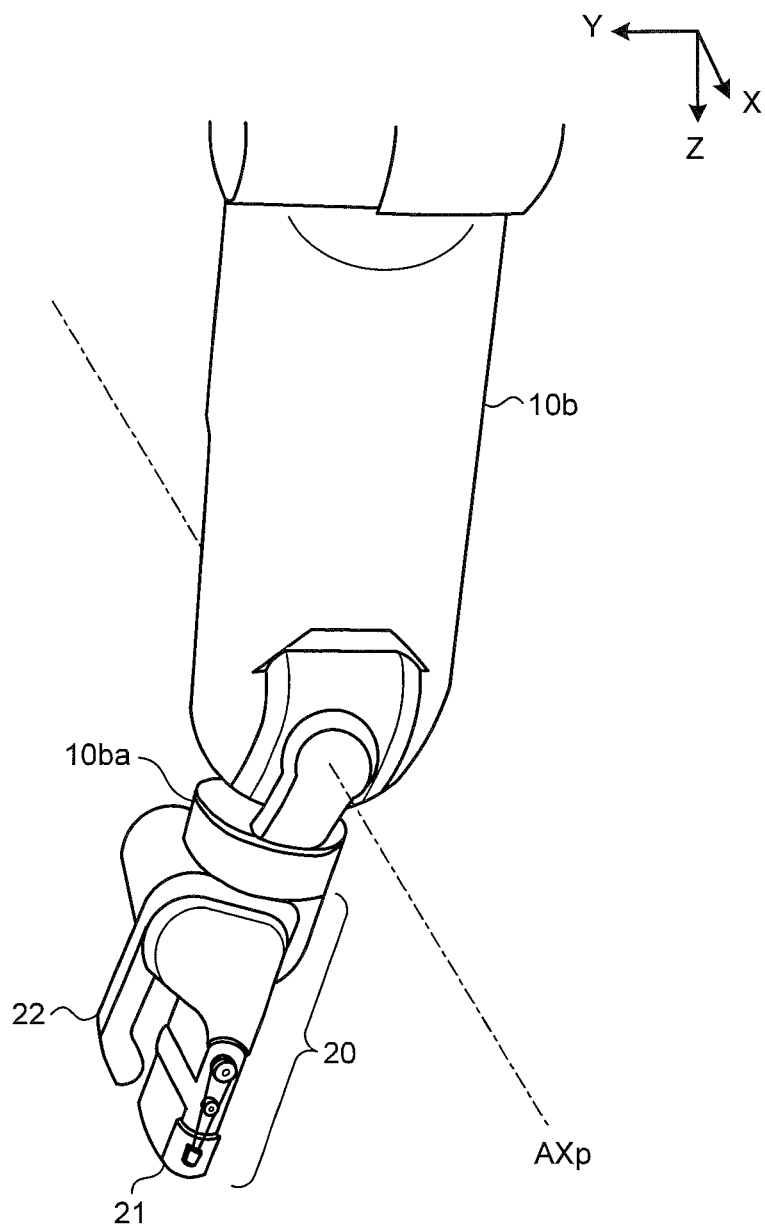
FIG. 2 is a perspective view of the robot hand according to the first embodiment.

An exemplary configuration of the robot hand 20 according to the first embodiment will be described below with reference to FIG. 2. FIG. 2 is a perspective view of the robot hand 20 according to the first embodiment. It is noted that FIG. 2 illustrates the robot hand 20 that corresponds to the left hand when the robot 10 (see FIG. 1B) is viewed from the X-axis positive direction.

Referring to FIG. 2, the robot hand 20 according to the first embodiment is mounted relative to a terminal moving part 10ba of the arm portion 10b. The terminal moving part 10ba can rotate about an axis AXp illustrated in FIG. 2. Thus, the robot hand 20 also rotates with the rotation of the terminal moving part 10ba.

As illustrated in FIG. 2, the robot hand 20 includes a finger mechanism 21 and a thumb portion 22. The robot hand 20 clamps a workpiece as an object to be held between the finger mechanism 21 and the thumb portion 22 to thereby hold the workpiece.

It is here noted that, in the following, an operating direction of the finger mechanism 21 when the workpiece is to be held, specifically, the direction in which the finger mechanism 21 is about to contact the workpiece will be described as a "gripping direction". Additionally, in the following, a rotational drive in the gripping direction may be described as a "forward rotation drive" and a rotational drive in a direction opposite to the "forward rotation drive" may be described as a "backward rotation drive".

Figure 3:
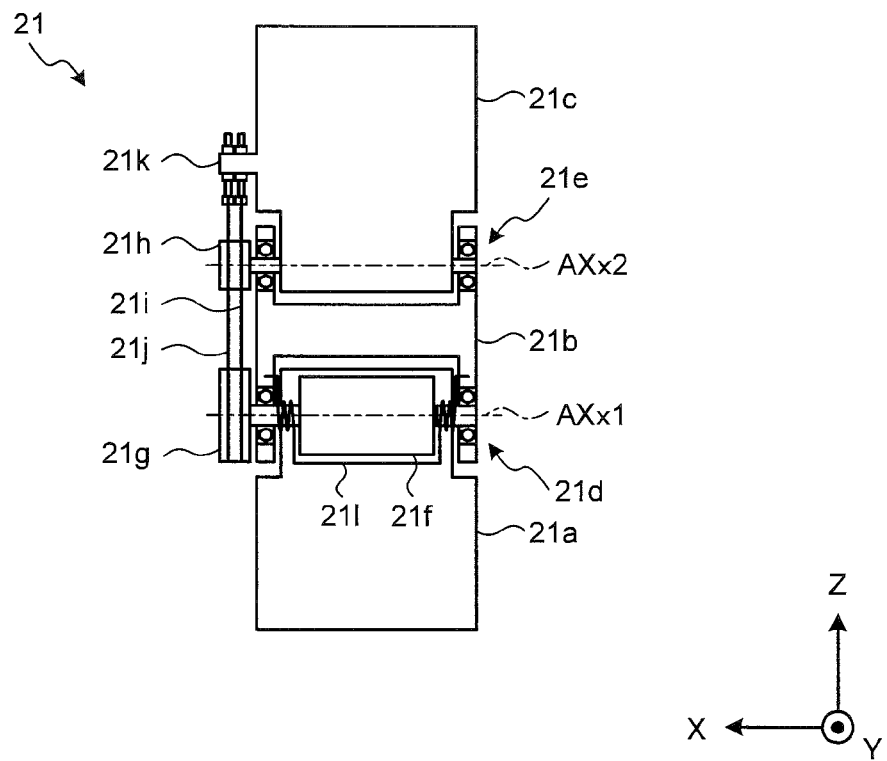
FIG. 3 is a front elevational view of a finger mechanism of the robot hand according to the first embodiment.

The exemplary configuration of the robot hand 20 will be described in greater detail with particular emphasis on the finger mechanism 21 with reference to FIG. 3. FIG. 3 is a front elevational view of the finger mechanism 21 of the robot hand 20 according to the first embodiment.

As illustrated in FIG. 3, the finger mechanism 21 includes a fixing portion 21a, a first finger joint portion 21b, and a second finger joint portion 21c.

The fixing portion 21a is fixed to the terminal moving part 10ba (see FIG. 2). A rotationally driving actuator 21f is disposed in the fixing portion 21a. The actuator 21f is an example of a means for driving.

The first finger joint portion 21b corresponds to the finger joint at the root of a human finger. The first finger joint portion 21b includes two sets of bearings (not illustrated) for friction reduction.

Of the two sets of bearings, a first set of bearings is supported on an axis AXx1 including an output shaft of the actuator 21f. It is noted that a moving mechanism including the bearings and the rotary shaft about the axis AXx1 will hereinafter be described as a "first joint portion 21d". The first joint portion 21d is an example of a joint portion at a proximal end.

Specifically, the first finger joint portion 21b is rotatably connected to the fixing portion 21a via the first joint portion 21d. Additionally, a drive pulley 21g is fixed to the output shaft of the actuator 21f. It is noted that the drive pulley 21g has a circular shape when viewed from the X-axis direction.

A torsion spring 21l may be disposed between the fixing portion 21a and the first finger joint portion 21b. The torsion spring 21l assumes an urging member that urges the first finger joint portion 21b in the gripping direction. The torsion spring 21l will be described in detail when operations of the finger mechanism 21 are described later.

Of the two sets of bearings, a second set of bearings supports a rotary shaft of the second finger joint portion 21c about an axis AXx2. It is noted that a moving mechanism including the bearings and the rotary shaft about the axis AXx2 will hereinafter be described as a "second joint portion 21e". The second joint portion 21e is an example of a joint portion at a distal end side.

Specifically, the second finger joint portion 21c is rotatably connected to the first finger joint portion 21b via the second joint portion 21e. The second finger joint portion 21c corresponds to the finger joint at the tip of the human finger.

A driven pulley 21h is fixed at a first end of the rotary shaft of the second finger joint portion 21c so as to be in juxtaposition with the drive pulley 21g. The driven pulley 21h also has a circular shape when viewed from the X-axis direction.

The first joint portion 21d and the second joint portion 21e are connected by a wire extended therebetween.

Specifically, as illustrated in FIG. 3, a forward rotation drive wire 21i is extended by having a first end fixed at the drive pulley 21g and a second end fixed at a terminal portion 21k disposed at the second finger joint portion 21c. At this time, the forward rotation drive wire 21i is trained in one direction, and fixed without slipping, over the drive pulley 21g and the driven pulley 21h. The forward rotation drive wire 21i is an example of a means for linking.

Similarly, a backward rotation drive wire 21j is extended by having a first end fixed at the drive pulley 21g and a second end fixed at the terminal portion 21k. At this time, the backward rotation drive wire 21j is trained in a direction opposite to the direction in which the forward rotation drive wire 21i is trained, and fixed without slipping, over the drive pulley 21g and the driven pulley 21h. The backward rotation drive wire 21j is an example of a means for linking.

This allows the rotational drive of the actuator 21f to be transmitted to the rotary shafts of the first joint portion 21d and the second joint portion 21e without slipping.

It is noted that, with the first joint portion 21d and the second joint portion 21e connected to each other as described above, torque generated at the first joint portion 21d and the second joint portion 21e by the rotational drive of the actuator 21f is such that output torque of the actuator 21f is distributed according to a ratio of the radius of the drive pulley 21g to the radius of the driven pulley 21h.

Although the wire is used in the example described above, any other member that can be extended may be used, including a timing belt. Additionally, the terminal portion 21k may include a mechanism for adjusting an effective length of each of the forward rotation drive wire 21i and the backward rotation drive wire 21j, in addition to receiving one end each of the forward rotation drive wire 21i and the backward rotation drive wire 21j fixed thereto.

Figure 4A:
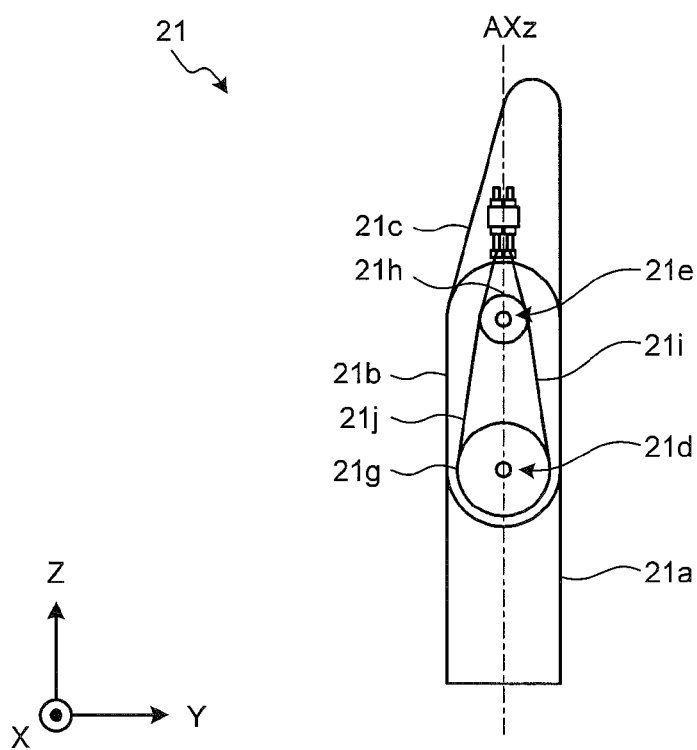
FIG. 4A is a side elevational view of the finger mechanism in its initial posture.
Figure 4B:
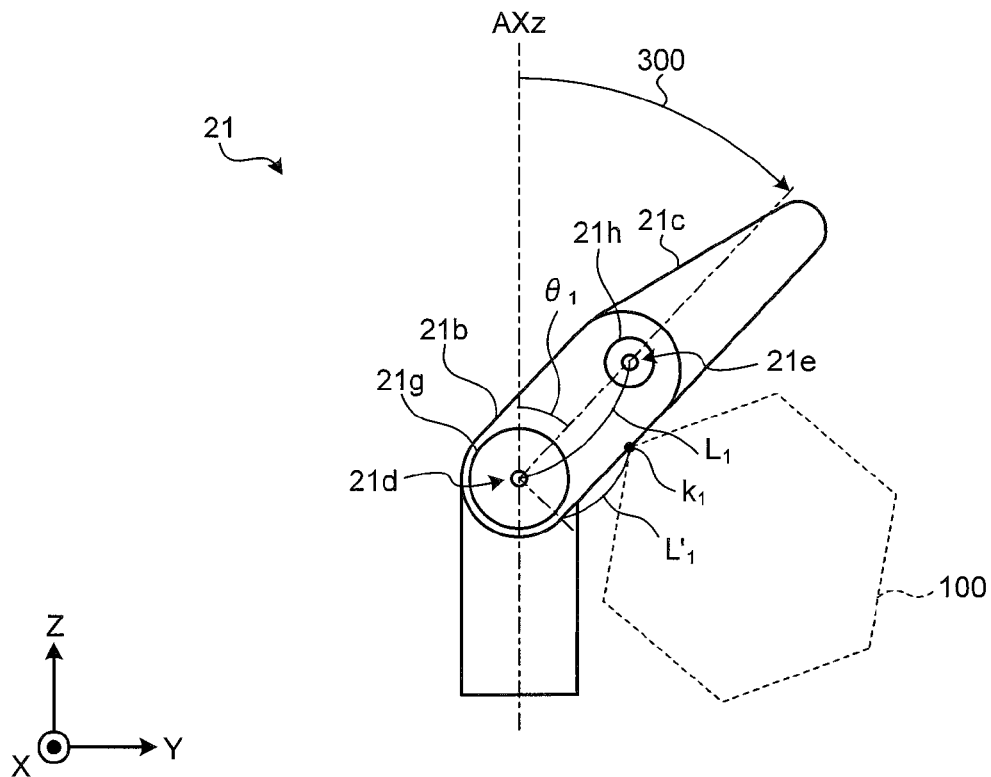
FIG. 4B is a schematic side elevational view of the finger mechanism in a first operating posture.
Figure 4C:
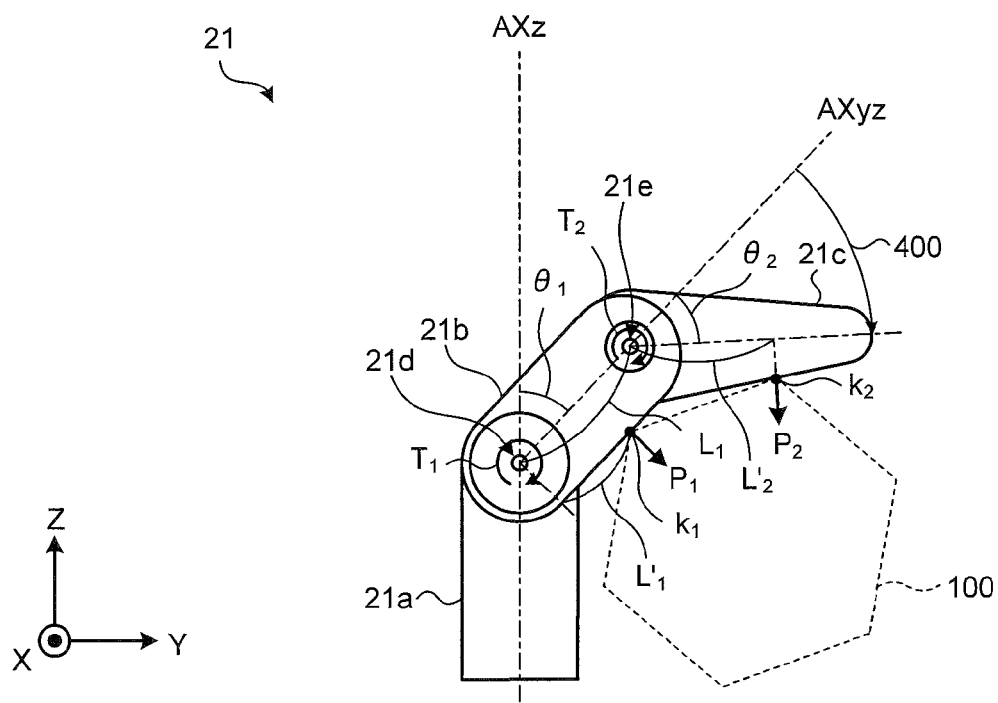
FIG. 4C is a schematic side elevational view of the finger mechanism in a second operating posture.

Operations of the robot hand 20 according to the first embodiment will be described below with reference to FIGS. 4A, 4B, and 4C. FIG. 4A is a side elevational view of the finger mechanism 21 in its initial posture. FIG. 4B is a schematic side elevational view of the finger mechanism 21 in a first operating posture. FIG. 4C is a schematic side elevational view of the finger mechanism 21 in a second operating posture.

It is noted that, as illustrated in FIGS. 4A to 4C, rotation in the gripping direction is clockwise when viewed from the X-axis positive direction.

As illustrated in FIG. 4A, in a stage in which a holding operation is not performed, the finger mechanism 21 takes an initial posture in which the rotary shafts of the first joint portion 21d and the second joint portion 21e are disposed on an axis AXz that extends substantially in parallel with the Z-axis.

The initial posture is maintained by tension of the extended forward rotation drive wire 21i and backward rotation drive wire 21j. As described earlier with reference to FIG. 3, the first finger joint portion 21b rotatably supports the output shaft of the actuator 21f and the rotary shaft of the second finger joint portion 21c using corresponding bearings.

To state the foregoing differently, the first finger joint portion 21b does not follow rotation of the shafts noted above.

However, the first finger joint portion 21b is fixed in a direction along the axis AXz by the tension of the forward rotation drive wire 21i and the backward rotation drive wire 21j and can be assumed to be integrated with the drive pulley 21g, and the second finger joint portion 21c via the driven pulley 21h.

Assume that the actuator 21f at the fixing portion 21a provides a forward rotation drive as the gripping operation is started. The forward rotation drive of the actuator 21f first generates torque at the first joint portion 21d.

As illustrated in FIG. 4B, the torque generated at the first joint portion 21d rotates the drive pulley 21g, and the first finger joint portion 21b and the second finger joint portion 21c integrated with the drive pulley 21g about the rotary shaft of the first joint portion 21d in a gripping direction 300 until the first finger joint portion 21b contacts a workpiece 100.

For convenience sake, the following definitions are given. Specifically, as illustrated in FIG. 4B, let "$L_1$" be a link length of the first finger joint portion 21b; let "$L'_1$" be a distance between the rotary shaft of the first joint portion 21d and a holding point $k_1$ as a contact point in the first finger joint portion 21b relative to the workpiece 100; and let "$\theta_1$" be an angle of rotation of the first joint portion 21d upon contact with the workpiece 100.

It is here noted that the first finger joint portion 21b in contact with the workpiece 100 is restricted in movement at the holding point $k_1$. Under this condition, the torque of the first joint portion 21d causes the drive pulley 21g to take up the forward rotation drive wire 21i (see FIG. 4A) and, through tension applied during the take-up, causes a driving force of the drive pulley 21g to be transmitted to the driven pulley 21h. Specifically, torque is generated at the second joint portion 21e.

Then, as illustrated in FIG. 4C, the torque generated at the second joint portion 21e cancels the abovementioned integration and rotates the second finger joint portion 21c only in a gripping direction 400 about the rotary shaft of the second joint portion 21e until the second finger joint portion 21c contacts the workpiece 100.

For convenience sake, the following definitions are given. Specifically, as illustrated in FIG. 4C, let "$L'_2$" be a distance between the rotary shaft of the second joint portion 21e and a holding point $k_2$ as a contact point in the second finger joint portion 21c relative to the workpiece 100; and let "$\theta_2$" be an angle of rotation of the second joint portion 21e with reference to an axis AXyz upon contact with the workpiece 100.

Specifically, as illustrated in FIGS. 4A to 4C, the finger mechanism 21, when performing the holding operation relative to the workpiece 100, performs a "copying operation" through which the shape of the workpiece 100 is copied with the first finger joint portion 21b that corresponds to the root of a finger and the second finger joint portion 21c that corresponds to the tip of the finger.

Through the "copying operation", the workpiece 100 can be supported at multiple points including the holding point $k_1$ and the holding point $k_2$. This enables of workpieces 100 of various shapes and sizes to be reliably held in place.

Referring to FIG. 4C, torque $T_1$ applied to the first joint portion 21d when the first finger joint portion 21b and the second finger joint portion 21c each contact the workpiece 100 can be calculated as follows. Let $m_1$ be mass of the first finger joint portion 21b, $m_2$ be mass of the second finger joint portion 21c, and g be gravitational acceleration. Then, the torque $T_1$ can be calculated as, for example, a sum of torque based on the holding point $k_1$ and torque based on the holding point $k_2$ using expression (1) given below:

Expression 1

$$T_1 = m_1 \cdot g \cdot L'_1 \cdot \cos\theta_1 + m_2 \cdot g \cdot \{L_1 \cdot \cos\theta_1 + L'_2 \cdot \cos(\theta_1 + \theta_2)\} \quad (1)$$

Similarly, torque $T_2$ applied to the second joint portion 21e can be calculated using, for example, expression (2) given below:

Expression 2

$$T_2 = m_2 \cdot g \cdot L'_2 \cdot \cos(\theta_1 + \theta_2) \quad (2)$$

When the finger mechanism 21 performs the "copying operation", preferably, the second finger joint portion 21c is prevented from being rotated solely and precedingly. To state this differently, preferably, the first finger joint portion 21b integrated with the second finger joint portion 21c is properly rotated precedingly.

This can be achieved by application of a predetermined urging force (specifically, an elastic force) of the torsion spring 21l (see FIG. 3) to the torque of the first joint portion 21d. Specifically, it is only required that a torsion spring 21l having an elastic force that satisfies the condition of expression (3) given below be disposed between the fixing portion 21a and the first finger joint portion 21b such that the elastic force is stored in the initial posture and the elastic force urges the first finger joint portion 21b in the gripping direction 300 (see FIG. 4B) in an operating posture.

Expression 3

$$T_b > m_1 \cdot g \cdot L'_1 \cdot \cos\theta_1 + m_2 \cdot g \cdot \{L_1 \cdot \cos\theta_1 - L'_2 \cdot \cos(\theta_1 + \theta_2)\} \quad (3)$$

Where, $T_b$ is torque urged by the elastic force of the torsion spring 21l.

It is noted that the right side of expression (3) is the greatest when the holding operation is started from the initial posture. Specifically, it is when $\cos\theta_1 = 1$ and $\cos(\theta_1 + \theta_2) = 1$ in which an effect of a gravitational force is the greatest. Substituting the foregoing for the right side of expression (3) obtains expression (4) that represents a condition for compensating for the gravitational force:

Expression 4

$$T_b > m_1 \cdot g \cdot L'_1 + m_2 \cdot g \cdot (L_1 - L'_2) \quad (4)$$

Thus, incorporating a torsion spring 21*l* having the elastic force that satisfies the condition of expression (4) enables the finger mechanism 21 to perform the "copying operation" reliably.

Pressure $P_1$ of the first finger joint portion 21*b* in the operating posture illustrated in FIG. 4C can be calculated using expression (5) given below, in which, for example, torque applied to the first joint portion 21*d* based on only the first finger joint portion 21*b* is divided by the distance $L'_1$ up to the holding point $k_1$:

Expression 5

$$P_1 = \frac{T_1 - T_2 \cdot \left(\frac{L_1}{L'_2} \cdot \cos\theta_2 + 1\right)}{L'_1} \quad (5)$$

Similarly, pressure $P_2$ of the second finger joint portion 21*c* in the operating posture illustrated in FIG. 4C can be calculated using expression (6) given below, in which, for example, torque applied to the second joint portion 21*e* based on only the second finger joint portion 21*c* is divided by the distance $L'_2$ up to the holding point $k_2$.

Expression 6

$$P_2 = \frac{T_2}{L'_2} \quad (6)$$

As described heretofore, the robot hand and the robot according to the first embodiment comprise a first joint portion and a second joint portion that rotate about respective rotary shafts extending in parallel with each other, a first finger joint portion and a second finger joint portion that are connected via the first joint portion and the second joint portion, a forward rotation drive wire and a backward rotation drive wire that rotate the first joint portion and the second joint portion adjacent thereto through operative association with each other, and an actuator that rotates only the first joint portion.

If the first finger joint portion is restricted in movement as a result of its contact with the workpiece when the robot hand and the robot according to the first embodiment hold a workpiece, tension is applied to the forward rotation drive wire to thereby operatively associate the second joint portion, so that the second finger joint portion may be rotated until the second finger joint portion contacts the workpiece.

Thus, the robot hand and the robot according to the first embodiment, while being built compact and lightweight, can reliably hold various types of workpieces. To release the workpiece, the actuator needs only to driven backward.

The first embodiment has been described for a case in which the output torque of the actuator as the drive source is distributed at the first joint portion and the second joint portion basically according to the ratio of the radius of the drive pulley to the radius of the driven pulley.

In addition, the first embodiment has been described for a case in which the torque applied to the first joint portion or the second joint portion (hereinafter described as "load torque") when the first finger joint portion or the second finger joint portion contacts the workpiece varies depending on the distance to the corresponding holding point and the angle of rotation of the corresponding joint (see expressions (1) and (2)).

In these respects, to maintain a stable holding posture in the holding operation, ideally, the ratio of the distributed output torque balances a ratio of variable load torque values at all times.

Figure 5:
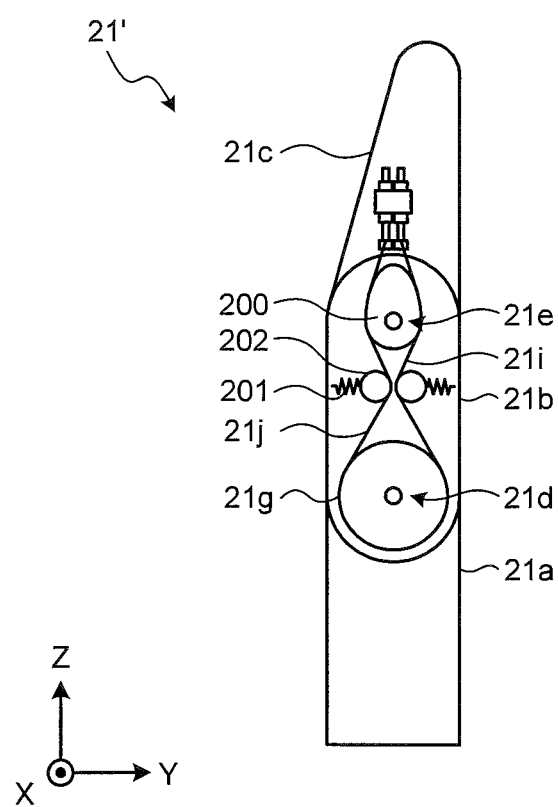
FIG. 5 is a side elevational view of a finger mechanism according to a second embodiment in its initial posture.
Figure 6:
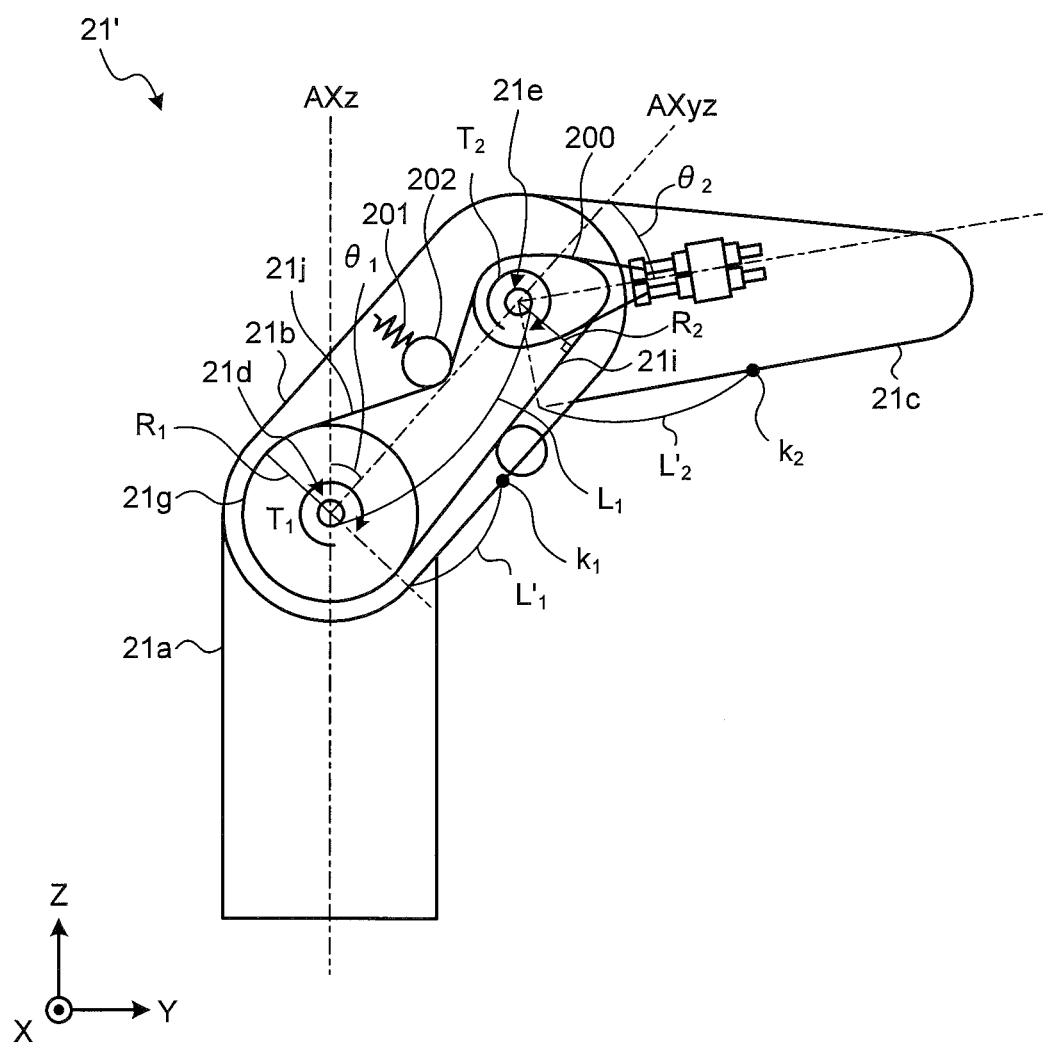
FIG. 6 is a side elevational view of the finger mechanism according to the second embodiment in its operating posture.

A second embodiment to be described below with reference to FIGS. 5 and 6 is thus concerned with a case in which a constant state of equilibrium between the ratio of the output torque and the ratio of the load torque values is achieved at all times by a non-circular pulley.

Second Embodiment

FIG. 5 is a side elevational view of a finger mechanism 21' according to a second embodiment in its initial posture. FIG. 6 is a side elevational view of the finger mechanism 21' according to the second embodiment in its operating posture. In FIGS. 5 and 6, like or corresponding parts are identified by the same reference numerals as those used for the finger mechanism 21 according to the first embodiment illustrated in FIGS. 3 and 4A to 4C and descriptions for those parts will be omitted or given only briefly.

As illustrated in FIG. 5, the finger mechanism 21' differs from the finger mechanism 21 according to the first embodiment described earlier in that the finger mechanism 21' includes a non-circular pulley 200 in place of the driven pulley 21*h* (see FIG. 4A). The finger mechanism 21' additionally differs from the finger mechanism 21 according to the first embodiment in that the finger mechanism 21' further includes a spring 201 and a tensioner 202 as illustrated in FIG. 5.

As with the driven pulley 21*h* (see FIG. 4A), the non-circular pulley 200 is fixed at a first end of a rotary shaft of a second finger joint portion 21*c*. In addition, a forward rotation drive wire 21*i* and a backward rotation drive wire 21*j* are wound around an outer peripheral surface of the non-circular pulley 200.

The spring 201 has an elastic force to press the tensioner 202 up against the forward rotation drive wire 21*i* and the backward rotation drive wire 21*j* at all times.

The tensioner 202 serves as a tension retaining member that is pressed by the spring 201 against the forward rotation drive wire 21*i* and the backward rotation drive wire 21*j* at all times to thereby eliminate slack in the forward rotation drive wire 21*i* and the backward rotation drive wire 21*j*, thus retaining tension. The retention of the tension further prevents the forward rotation drive wire 21*i* and the backward rotation drive wire 21*j* from falling off from respective pulleys.

Reference is now made to FIG. 6. When torque occurs at a second joint portion 21*e*, the non-circular pulley 200 rotates, while changing an effective diameter $R_2$ according to an angle of rotation $\theta_2$ of the second joint portion 21*e*. Any change in the tension in the forward rotation drive wire 21*i* and the backward rotation drive wire 21*j* as a result of the change in the effective diameter $R_2$ of the non-circular pulley 200 is at this time taken up by the tensioner 202 pressed by the spring 201.

The effective diameter $R_2$ of the non-circular pulley 200 varying according to the angle of rotation $\theta_2$ of the second joint portion 21*e* can be obtained, for example, as follows. It is assumed that a drive pulley 21*g* has a circular shape and a radius denoted $R_1$. Additionally, a link length $L_1$ of a first finger joint portion 21*b* and a distance $L'_2$ between a rotary shaft of the second joint portion 21*e* and a holding point $k_2$ are the same as those in the first embodiment described earlier.

Based on expression (1) and expression (2) given in the first embodiment described earlier, a ratio of load torque $T_1$ applied to a first joint portion 21*d* to load torque $T_2$ applied to the second joint portion 21*e* is given by expression (7) given below:

Expression 7

$$\frac{T_1}{T_2} = \frac{L_1}{L_2'} \cdot \cos\theta_2 + 1 \tag{7}$$

The ratio of the load torque $T_1$ to the load torque $T_2$ needs to be balanced with the ratio of the distributed output torque at all times. Thus, by substituting the left side of expression (7) for the ratio of the radius $R_1$ of the drive pulley 21*g* to the effective diameter $R_2$ of the non-circular pulley 200, a relational expression of expression (8) given below can be derived:

Expression 8

$$\frac{R_1}{R_2} = \frac{L_1}{L_2'} \cdot \cos\theta_2 + 1 \tag{8}$$

Solving for the effective diameter $R_2$ using the relational expression (8) derives expression (9) given below:

Expression 9

$$R_2(\theta_2) = \frac{R_1}{\frac{L_1}{L_2'} \cdot \cos\theta_2 + 1} \tag{9}$$

Specifically, the effective diameter $R_2$ according to the angle of rotation $\theta_2$ of the second joint portion 21*e* is obtained using expression (9). This allows the shape of the non-circular pulley 200 to be adjusted in advance.

This enables the finger mechanism 21' to maintain a stable holding posture at all times. Thus, the finger mechanism 21', while being built compact and lightweight, can reliably hold various types of workpieces. Additionally, the stable holding posture allows the finger mechanism 21' to be applied also to, for example, a picking operation in which a small part is picked. This provides a robot hand that is highly versatile and applicable to widely ranging applications.

As described above, the robot hand and the robot according to the second embodiment comprise a first joint portion and a second joint portion that rotate about respective rotary shafts extending in parallel with each other, a first finger joint portion and a second finger joint portion that are connected via the first joint portion and the second joint portion, a forward rotation drive wire and a backward rotation drive wire that rotate the first joint portion and the second joint portion adjacent thereto through operative association with each other, and an actuator that rotates only the first joint portion.

The robot hand and the robot according to the second embodiment include the drive pulley at a first end of the first joint portion and the non-circular pulley at a first end of the second joint portion. The shape of the non-circular pulley is adjusted in advance so that the ratio of the output torque of the actuator distributed between the first joint portion and the second joint portion remains constant at all times according to the change in the angle of rotation of the second joint portion during rotational drive of the actuator.

Thus, the robot hand and the robot according to the second embodiment, while being built compact and lightweight, can reliably hold various types of workpieces. In addition, the stable holding posture can provide a robot hand that is highly versatile and applicable to widely ranging applications.

While each of the embodiments described above has been described for operations of a single finger mechanism, the present invention may be applied to an arrangement having two or more finger mechanisms. The present invention may even be applied to an arrangement in which the thumb portion is included in the finger mechanism.

While each of the embodiments described above has been described for a case in which one finger mechanism includes two finger joint portions, the finger mechanism may include three or more finger joint portions. In addition, each of the embodiments described above has been described for a case in which the actuator as the drive source is disposed at the fixing portion and has an output shaft that is identical to the rotary shaft of the drive pulley. This, however, does not intend to limit the position at which the actuator is disposed and the method for connecting the actuator to the drive pulley.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot hand comprising:
   a plurality of joint portions that rotates about respective rotation axes parallel with each other;
   a plurality of links that is connected via the joint portions;
   a linking member that links rotations of the joint portions adjacent to each other;
   a single drive source that drives and rotates one of the plurality of joint portions which is located at a proximal end to rotate the joint portions; and
   an urging member that has a predetermined urging force adjusted in advance based on weights and lengths of the plurality of links so that the joint portions rotate in sequence from the proximal end to a distal end, the urging member urging one of the plurality of links, which is moved by the joint portion at the proximal end, in a gripping direction with the predetermined urging force,
   wherein, when one link of the plurality of links is restricted in movement in the gripping direction as a result of contact thereof with a workpiece as an object to be held while the workpiece is being held, one of the joint portions, which is connected to a distal end of the one link, rotates relative to the one link for moving another link adjacent to the one link among the plurality of links.

2. The robot hand according to claim 1, wherein the linking member includes:
   a forward-rotation-drive linking member provided corresponding to a forward direction of the rotations of the joint portions, the forward direction being the gripping direction; and
   a backward-rotation-drive linking member provided corresponding to a backward direction of the rotations of the joint portions, the backward direction being a direction opposite to the gripping direction.

3. The robot hand according to claim 2, wherein the linking members are a wire or a timing belt.

4. The robot hand according to claim 1, wherein
each of the joint portions has a pulley at one end of the rotation axis, and
the pulley placed on one of the joint portions which is located at the distal end of the joint portions has an effective diameter which becomes larger as an angle of rotation of the joint portion at the distal end becomes larger.

5. The robot hand according to claim 4, further comprising a tension retaining member that eliminates slack in the linking member and retains tension even with the change in the angle of rotation by being pressed against the linking member with a predetermined elastic force at all times.

6. The robot hand according to claim 4, wherein the pulley placed on one of the joint portions which is located at the distal end has an oval shape.

7. The robot hand according to claim 4, wherein the linking member includes:
a forward-rotation-drive linking member provided corresponding to a forward direction of the rotations of the joint portions, the forward direction being the gripping direction; and
a backward-rotation-drive linking member provided corresponding to a backward direction of the rotations of the joint portions, the backward direction being a direction opposite to the gripping direction.

8. The robot hand according to claim 7, further comprising:
a first tension retaining member that eliminates slack in the forward-rotation-drive linking member and retains tension even with the change in the angle of rotation by being pressed against the forward-rotation-drive linking member with a predetermined elastic force at all times; and
a second tension retaining member that eliminates slack in the backward-rotation-drive linking member and retains tension even with the change in the angle of rotation by being pressed against the backward-rotation-drive linking member with a predetermined elastic force at all times.

9. The robot hand according to claim 1, wherein a torque urged by the predetermined urging force of the urging member is larger than a torque applied to the joint portion at the proximal end when the plurality of links contact with the workpiece.

10. A robot comprising a robot hand,
the robot hand comprising:
a plurality of joint portions that rotates about respective rotation axes parallel with each other;
a plurality of links that is connected via the joint portions;
a linking member that links rotations of the joint portions adjacent to each other;
a single drive source that drives and rotates one of the joint portions which is located at a proximal end of the joint portions; and
an urging member that has a predetermined urging force adjusted in advance based on weights and lengths of the plurality of links so that the joint portions rotate in sequence from the proximal end to a distal end, the urging member urging one of the plurality of links, which is moved by the joint portion at the proximal end, in a gripping direction with the predetermined urging force,
wherein, when one link of the plurality of links is restricted in movement in the gripping direction as a result of contact thereof with a workpiece as an object to be held while the workpiece is being held, one of the joint portions, which is connected to a distal end of the one link, rotates relative to the one link for moving another link adjacent to the one link among the plurality of links.

11. A robot hand comprising:
a plurality of joint portions that rotates about respective rotation axes parallel with each other;
a plurality of links that is connected via the joint portions;
means for linking rotations of the joint portions adjacent to each other;
means for driving and rotating one of the plurality of joint portions at a proximal end of the joint portions; and
means for urging one of the plurality of links, which is moved by the joint portion at the proximal end, in a gripping direction with a predetermined urging force, the predetermined urging force being adjusted in advance based on weights and lengths of the plurality of links so that the joint portions rotate in sequence from the proximal end to the distal end,
wherein, when one link of the plurality of links is restricted in movement in the gripping direction as a result of contact thereof with a workpiece as an object to be held while the workpiece is being held, one of the joint portions, which is connected to a distal end of the one link, rotates relative to the one link for moving another link adjacent to the one link among the plurality of links.

12. A robot hand comprising:
a plurality of joint portions that rotates about respective rotation axes parallel with each other;
a plurality of links that is connected via the joint portions;
a linking member that links rotations of the joint portions adjacent to each other; and
a single drive source that drives and rotates one of the plurality of joint portions which is located a joint portion at a proximal end of the joint portions, wherein
each of the joint portions has a pulley at one end of the rotation axis, and
the pulley placed on one of the joint portions which is located at the distal end of the joint portions has an effective diameter which becomes larger as an angle of rotation of the joint portion at the distal end becomes larger.

13. The robot hand according to claim 12, wherein the pulley placed on one of the joint portions located at the distal end has an oval shape.

* * * * *